United States Patent
Stitt

(10) Patent No.: US 6,446,817 B1
(45) Date of Patent: Sep. 10, 2002

(54) TAPE CARTRIDGE STORAGE UNIT

(75) Inventor: Jeffrey L. Stitt, Levittown, PA (US)

(73) Assignee: NER Data Products, Inc., Franklinville, NJ (US)

( * ) Notice: Subject to any disclaimer, the term of this patent is extended or adjusted under 35 U.S.C. 154(b) by 0 days.

(21) Appl. No.: 09/782,336

(22) Filed: Feb. 13, 2001

(51) Int. Cl.[7] .............................................. A47G 19/08
(52) U.S. Cl. ..................... 211/41.12; 211/134; 211/188
(58) Field of Search ............................... 211/40, 41.12, 211/186–188, 153, 194, 126.2, 207, 133.1, 134–135, 128.1; 312/242, 245, 9.47–9.61; 108/107, 165, 162, 106, 147.11, 144.11, 60, 180

(56) References Cited

U.S. PATENT DOCUMENTS

| | | | | |
|---|---|---|---|---|
| 2,135,093 A | * | 11/1938 | Abrams | |
| 3,069,216 A | * | 12/1962 | Vaeth | |
| 3,168,365 A | * | 2/1965 | Evans | |
| 4,153,311 A | * | 5/1979 | Takahashi | 312/111 |
| 4,155,447 A | | 5/1979 | Edwards | |
| 4,373,449 A | * | 2/1983 | Klaus et al. | 108/60 |
| 4,519,319 A | * | 5/1985 | Howlett | 108/111 |
| 4,600,107 A | | 7/1986 | Price et al. | |
| 4,688,682 A | | 8/1987 | Price et al. | |
| 4,760,928 A | * | 8/1988 | Bustos | 211/59.4 |
| 4,782,958 A | | 11/1988 | Price et al. | |
| 4,813,553 A | * | 3/1989 | Franklin et al. | 211/133.1 |
| 4,971,199 A | | 11/1990 | Price, Jr. et al. | |
| 5,253,769 A | * | 10/1993 | Vlastakis | 211/126 |
| 5,265,740 A | | 11/1993 | Hodsden et al. | |
| 5,392,902 A | * | 2/1995 | Vlastakis | 211/135 |
| 5,427,446 A | | 6/1995 | Glomski | |
| 5,651,456 A | | 7/1997 | Gunning | |
| 5,749,477 A | * | 5/1998 | Chang | 211/40 |
| 5,934,463 A | * | 8/1999 | Yu | 211/41.12 |
| 6,039,190 A | * | 3/2000 | Clausen | 211/40 |
| 6,068,140 A | * | 5/2000 | Mangrum et al. | 211/132.1 |
| 6,126,022 A | * | 10/2000 | Merkel | 211/135 |
| 6,196,647 B1 | * | 3/2001 | Kupferschmid | 312/9.48 |

* cited by examiner

*Primary Examiner*—Daniel P. Stodola
*Assistant Examiner*—Jennifer E. Novosad
(74) *Attorney, Agent, or Firm*—Norman E. Lehrer

(57) ABSTRACT

A storage unit holds a variety of tape cartridges and includes a box-like structure with a back wall and right, left, top, and bottom walls extending therefrom. The structure includes a plurality of dividers with a series of ribs located on one or both sides of each divider. The ribs are spaced apart from each other and form slots into which the cartridges are placed. The back edge of each divider has a tab which fits into a slot located in the back wall of the box-like structure. The right and left walls of the structure each has a series of grooves into which the dividers fit. Combinations of different dividers may be placed within the unit. Also, the dividers may be placed within any of the grooves so that the dividers are spaced apart from each other as necessary. The entire unit may then be placed within a rack.

9 Claims, 4 Drawing Sheets

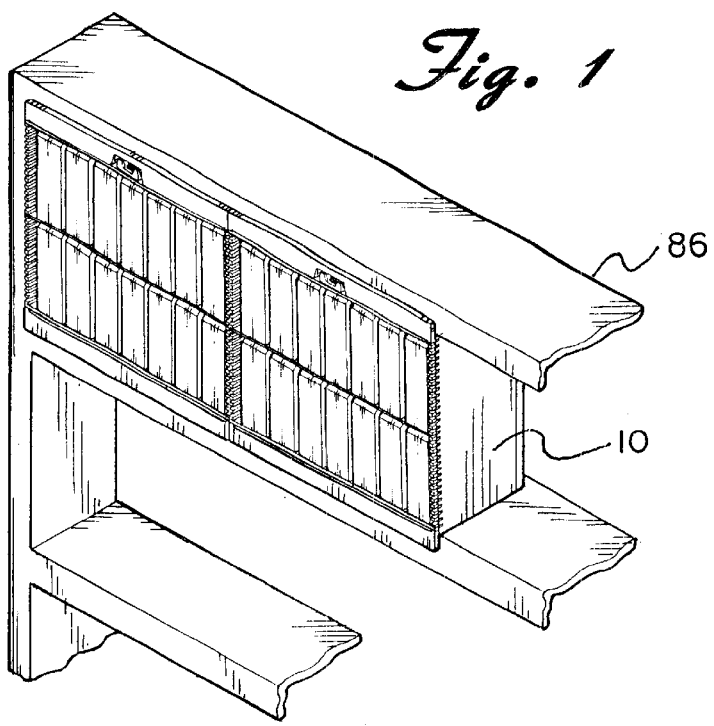
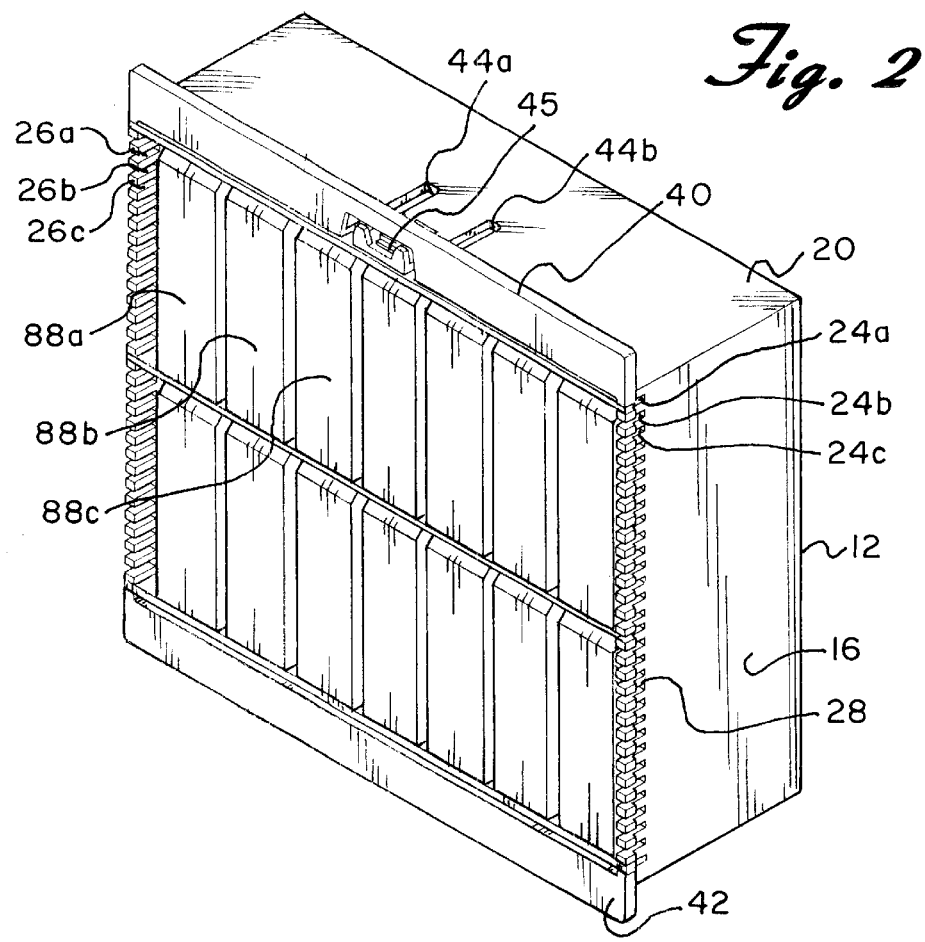

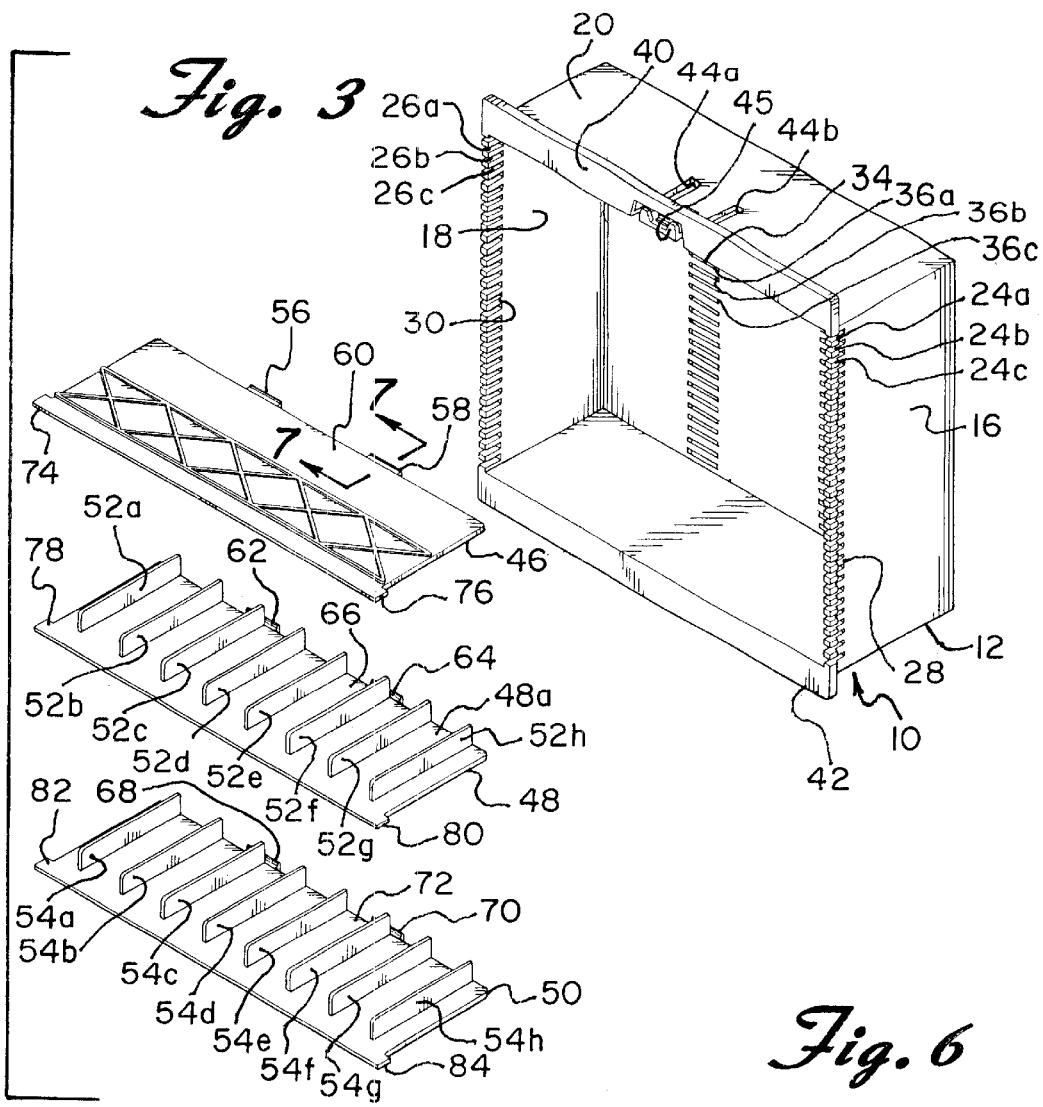
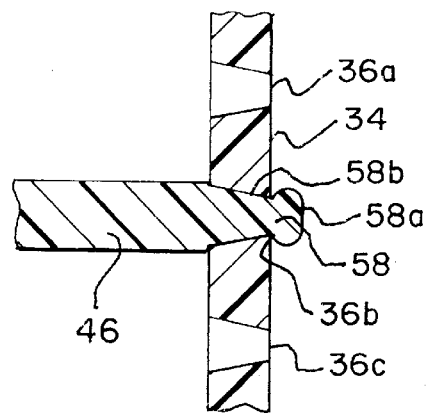
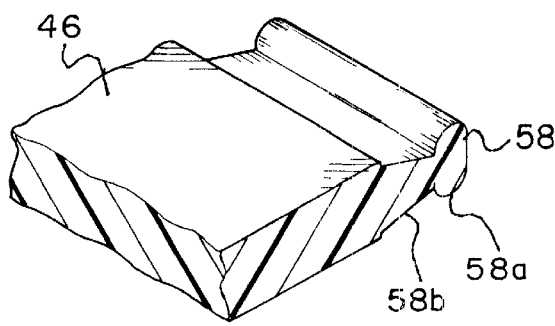

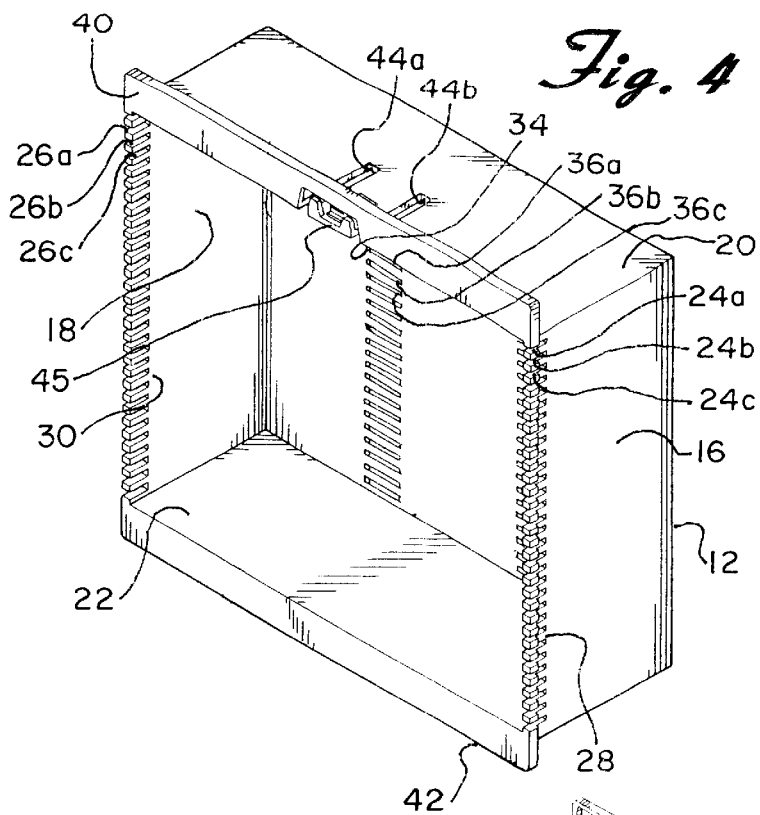
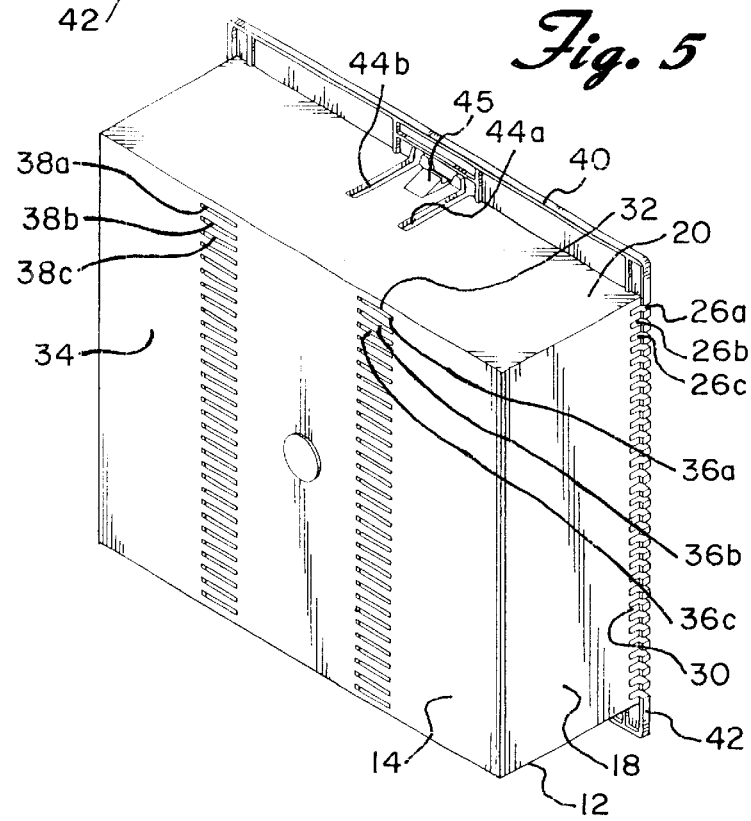

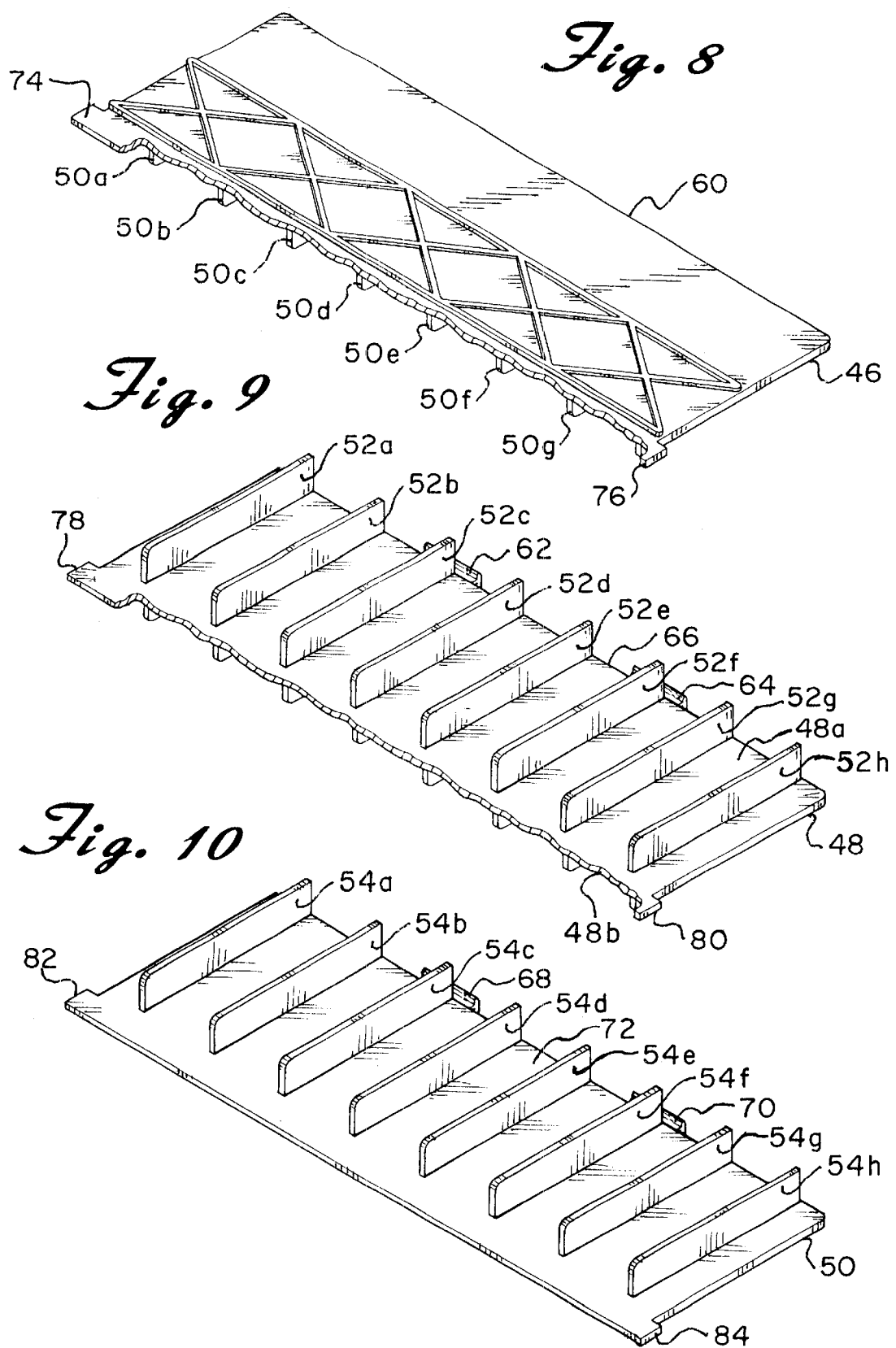

TAPE CARTRIDGE STORAGE UNIT

BACKGROUND OF THE INVENTION

The present invention is directed toward a tape cartridge storage unit and more particularly, toward a storage unit wherein the amount of storage slots within the unit may be increased or decreased and the unit is capable of accommodating various types of cartridges.

U.S. Pat. Nos. 4,600,107; 4,688,682; 4,782,958; and 4,971,199 to Price et al. teach the general concept of a tape cartridge storage rack into which various storage units may be placed. Each storage unit has shelves with dividers into which the cartridges are placed. These storage units, however, are not compatible with a wide variety of racks and the storage area within each unit cannot be increased or decreased, depending upon the size of the cartridges being stored.

U.S. Pat. No. 5,427,446 to Glomski discloses a sound recording storage cabinet for housing audio tapes, video tapes, and compact discs. The cabinet includes a box with interior walls slotted to receive horizontal shelves for holding audio tapes, video tapes, etc. The shelves have ribs which are spaced apart from each other, thereby forming slots into which the various media are placed. The ends of the shelves have flanges which fit into slits located on the side walls of the box. However, this storage cabinet is constructed to be installed in a residential wall and would not be suitable in other types of environments, for example, in an office where storage and wall space are often limited. Furthermore, these cabinets cannot be used in existing storage racks.

SUMMARY OF THE INVENTION

The present invention is designed to overcome the deficiencies of the prior art discussed above. It is an object of the present invention to provide a storage unit for storing tape cartridges which is easily insertable and removable from a storage rack.

It is a further object of the present invention to provide a storage unit which is compatible with a wide variety of storage racks and cartridges.

It is another object of the present invention to provide a storage unit in which the amount of storage slots may be increased or decreased, depending upon the size of the cartridges being stored.

In accordance with the illustrative embodiments demonstrating features and advantages of the present invention, there is provided a storage unit for holding a wide variety of tape cartridges which includes a box-like frame structure comprised of a back wall, a right side wall, a left side wall, a top wall, and a bottom wall. The frame structure can house a plurality of separate shelves or dividers with a series of ribs located on one or both sides of each divider. The ribs are spaced apart from each other and form slots into which the cartridges are placed. The back edge of each divider has a tab which fits into a slot located in the back wall of the box-like outer frame. The front edge of the right and left side walls has a series of grooves into which the dividers fit. Combinations of different dividers may be placed within the unit. Also, the dividers may be placed within any of the grooves so that the dividers are spaced apart from each other as necessary. The entire unit may then be placed within a rack.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a schematic representation of the storage unit of the present invention placed within a rack;

FIG. 2 is a perspective view of the storage unit of the present invention shown with tape cartridges placed therein;

FIG. 3 is an exploded view of the shelves which are placed within the storage unit of the present invention;

FIG. 4 is a front perspective view of the storage unit of the present invention shown without dividers or tape cartridges;

FIG. 5 is a rear perspective view of the storage unit of the present invention;

FIG. 6 is a partial cross-sectional view of a shelf fitting within the storage unit of the present invention;

FIG. 7 is a cross-sectional view taken through line 7—7 of FIG. 3;

FIG. 8 is a perspective view of one type of shelf which fits within the storage unit of the present invention;

FIG. 9 is a perspective view of a second type of shelf which fits within the storage unit of the present invention; and FIG. 10 is a perspective view of a third type of shelf which fits within the storage unit of the present invention.

DETAILED DESCRIPTION OF THE PREFERRED EMBODIMENTS

Referring now to the drawings in detail wherein like reference numerals have been used throughout the various figures to designate like elements, there is shown in FIG. 3 a tape cartridge storage unit constructed in accordance with the principles of the present invention and designated generally as 10.

The device essentially includes a storage unit 10 for holding a wide variety of media such as CD ROM, video cassettes, and a variety of other magnetic tape cartridges. (See FIGS. 1 and 2.) The storage unit includes a box-like frame structure 12 comprised of a back wall 14, a right side wall 16, a left side wall 18, a top wall 20, and a bottom wall 22. Each of the right and left side walls 16 and 18, respectively, has a plurality of grooves, seen for example as 24a, 24b, and 24c on the front edge 28 of right wall 16 and 26a, 26b, and 26c on the front edge 30 of left wall 18. The back wall 14 has two vertical rows 32 and 34 of slots located therein, seen for example, as 36a, 36b, and 36c in row 32 and 38a, 38b, and 38c in row 34. (See FIG. 5.) The slots may be tapered. (See FIG. 6.) The number of slots and grooves are the same and are in vertical alignment with each other. The top wall 20 has an upwardly extending member 40. Likewise, the bottom wall 22 has a downwardly extending member 42. (See FIG. 4.) The top wall 20 also has openings 44a and 44b with a flexible member 45 located therebetween. The flexible member 45 acts as a locking clip which will be discussed in greater detail below. The structure may be made from plastic or the like material.

The unit also includes a plurality of dividers or shelves 46, 48, and 50, for example. (See FIGS. 8–10.) Each divider has a top side and a bottom side, seen for example, as 48a and 48b on divider 48. The dividers may have a plurality of ribs located on the top side which act as slots within which the various media may be placed. For example, divider 50 has ribs 54a, 54b, 54c, 54d, 54e, 54f, 54g, and 54h. (See FIG. 10.) The distance between the ribs varies depending upon what type of media is being stored. The dividers may also have ribs located only on the bottom side. For example, divider 46 has ribs 50a, 50b, 50c, 50d, 50e, 50f, and 50g. (See FIG. 8.) The dividers may also have ribs located on both the top and bottom sides of the divider. For example, divider 48 has ribs 52a, 52b, 52c, 52d, 52e, 52f, 52g, and 52h. (See FIG. 9.) The back edge of each of the dividers has two tabs. Each tab has a rounded or enlarged end and a tapered or reduced portion. For example, divider 46 has tabs 56 and 58 located along the back edge 60 and extending outwardly therefrom. (See FIG. 3.) In FIG. 7, tab 58 is shown with rounded end 58a and tapered portion 58b. Divider 48 has tabs 62 and 64 located along the back edge 66 and extending outwardly therefrom. Likewise, divider 50 has tabs 68 and 70 located on the back edge 72. Located on the front side edges of each of the dividers are two flanges. Divider 46 has flanges 74 and 76. Divider 48 has flanges 78 and 80 and divider 50 has flanges 82 and 84.

In order to place a divider into the frame structure, using divider 46 as an example, the back edge 60 of the divider 46 is inserted into the structure first so that the tabs 56 and 58 snap into the slots 36b and 38b, respectively. That is, the enlarged end of the tab snaps into and through the slot with the enlarged end resting beyond the back wall so as to form an interference fit with the slot. For example, tapered portion 58b of the tab 58 fits within the tapered slot 36b and the rounded end 58a of the tab 58 abuts the back wall 14. (See FIG. 6.) The flanges 74 and 76 on the front side edges of the divider 46 fit into corresponding grooves located on the right wall 16 and the left wall 18 so that the flanges 74 and 76 also snap into place. In this manner, the divider is releasably locked or secured within the slots. The entire unit may then be placed within a rack 86. Locking clip 45 is depressed as the unit is placed within the rack 86 and snaps into place, securing the unit within the rack. Members 40 and 42 abut the top and bottom of the rack, respectively, thereby further securing the unit within the rack 86. (See FIG. 1.).

A variety of different dividers may be placed within the unit. Also, the dividers may be placed within any of the grooves and slots so that the dividers are spaced apart from each other as necessary. Tape cartridges 88a, 88b, and 88c, for example, may be placed within the unit. (See FIG. 2.) Furthermore, intermediate shelves would not be necessary if tall cartridges are being stored. Alternatively, an intermediate shelf could have different arrangements of ribs on the top and bottom sides to match top and bottom shelves so that different size cartridges can be stored on the top and the bottom.

When it is desired to remove a divider from the unit, the rounded ends of the tabs are pushed through the slots, thereby releasing the divider. When it is desired to remove a storage unit from the rack 86, the locking clip 45 is depressed so that the unit can be slid out of the rack.

The present invention may be embodied in other specific forms without departing from the spirit or essential attributes thereof and accordingly, reference should be made to the appended claims rather than to the foregoing specification as indicating the scope of the invention.

I claim:

1. A storage unit for storing various types of tape cartridges comprising:

a frame structure including a top wall, a bottom wall, a back wall, a right side wall, and a left side wall;

said back wall containing at least one slot formed therein;

said right and left side walls each having at least one groove formed therein;

a plurality of shelves; and means for releasably securing said shelves within said slot and grooves wherein said releasably securing means includes at least one tab and two flanges located on said shelf, said tab fitting into said slot and each of said flanges fitting into one of said grooves, said tab having a reduced portion and an enlarged end, wherein said enlarged end of said tab snaps into and through said slot with said enlarged end resting beyond said back wall to form an interference fit with said slot.

2. The storage unit for storing various types of tape cartridges of claim 1 wherein said back wall contains two vertical rows of slots formed therein.

3. The storage unit for storing various types of tape cartridges of claim 1 wherein each of said right and left side walls has a plurality of grooves formed therein.

4. The storage unit for storing various types of tape cartridges of claim 1 wherein each of said shelves has a top side and a bottom side.

5. The storage unit for storing various types of tape cartridges of claim 4 wherein at least one of said sides has at least one rib located thereon.

6. The storage unit for storing various types of tape cartridges of claim 4 wherein each of said sides has at least one rib located thereon.

7. The storage unit for storing various types of tape cartridges of claim 4 wherein each of said sides has a plurality of ribs located thereon.

8. The storage unit for storing various types of tape cartridges of claim 1 wherein said top wall has means adapted to secure said structure into a rack.

9. The storage unit for storing various types of tape cartridges of claim 8 wherein said securing means includes a locking clip.

* * * * *